Jan. 10, 1956  F. H. OWENS  2,730,565
PRODUCTION OF COMPOSITE LIVE ACTION
AND SCENIC EFFECTS FOR TELEVISION
Filed March 21, 1951
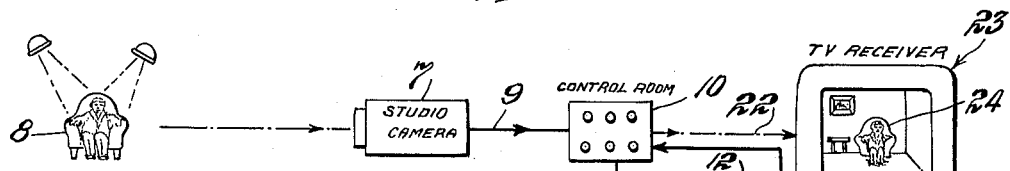
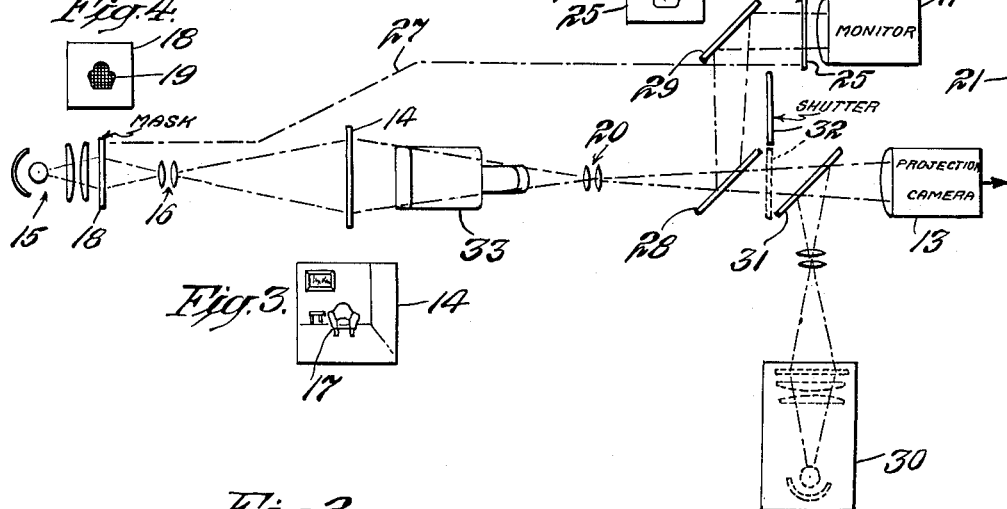
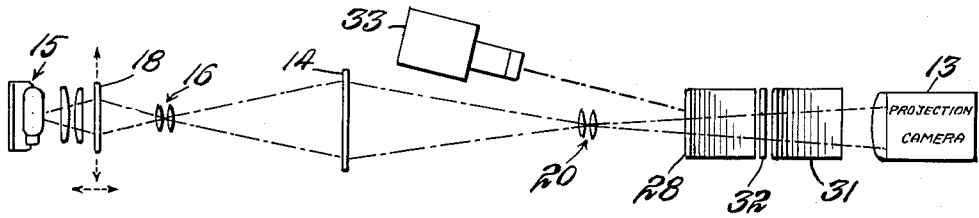
INVENTOR.
FREEMAN H. OWENS
BY
Philip L. McGean
ATTORNEY

United States Patent Office 2,730,565
Patented Jan. 10, 1956

2,730,565

PRODUCTION OF COMPOSITE LIVE ACTION AND SCENIC EFFECTS FOR TELEVISION

Freeman H. Owens, New York, N. Y.

Application March 21, 1951, Serial No. 216,792

3 Claims. (Cl. 178—6)

The invention here disclosed is a system for televising separate subjects and for then combining and telecasting the same as a unified composite picture.

A particular purpose of the invention is to enable the action portion of a picture to be televised without regard to accompanying scenery or background and to supply the missing scenic effects from a separately televised subject such as a picture of the desired subject matter appearing on a card or transparency.

In this way the invention eliminates the need for expensive studio "sets" and makes it possible to supply the "scene" for any particular action from a simple picturization of that scene.

Important objects of the invention are to accomplish these highly desirable results in a thoroughly practical manner adapted to present studio practices and at a minimum of cost for new equipment.

Other desirable objects attained by the invention are set forth or will appear in the course of the following specification.

The drawing accompanying and forming part of the specification illustrates a present typical embodiment of the invention. Actual structure and arrangement, however, may be modified and changed in various ways to meet different requirements and expansion of the invention, all within the true intent and broad scope of the invention as hereinafter defined and claimed.

Fig. 1 in the drawing is a diagrammatic and partial plan view of apparatus arranged for carrying out the invention, indicating in addition to the studio equipment, a television receiver adapted to pick up the composite picture transmitted by the studio;

Fig. 2 is a diagrammatic view with portions of the same apparatus appearing in side elevation;

Fig. 3 is a face view of a card or transparency televised by a second projection camera and carrying a picture of the background or scene to be combined with the picture of the live subject being televised by the studio camera;

Fig. 4 is a face view of a mask used with the projection camera, shaped to blank out the outline of the subject televised by the action camera, thus to prevent overlay or superposition of one televised subject over the other;

Fig. 5 is a face view of a mask carrying an open outline of the subject and used as a sighting medium in front of the monitor for registering the background scene with the live action and which may be connected to effect corresponding movements of the first mentioned, blanking mask.

In Fig. 1 a studio camera is indicated at 7 for picking up the live action of an actor, for instance, seated in a chair 8. Except for necessary "props" this action may be on a bare stage, possibly with a black background.

This studio camera is shown connected at 9 with the control room 10 and the results of this camera are shown on the monitor 11 connected with the control room at 12.

The second camera for supplying the background or scenic effects is indicated at 13, arranged to televise and transmit that portion of the scene which is to form the background or other part of the composite picture carrying the live action.

Fig. 3 shows what may be considered a suitable background 14 for the live subject. This may be on a card or transparency shown in Fig. 1 as illuminated by a light source 15 and lens system 16.

It will be noted in Fig. 3 that the background representation or picture 14 carries an outline 17 of the space occupied by the live subject, representing the outline which is to be blocked out and left to be occupied by the televised live subject.

Fig. 4 shows the mask 18 which is employed to effect this blocking out, this mask having a solid black area 19 corresponding more or less generally to the outline 17 on the background picture left for the live subject.

Fig. 1 shows how mask 18 may be inserted between the light source 15 and the scenic card or transparency 14 to block off the light from the live action area 19 and to illuminate only the surrounding scenic area which is transmitted by the secondary lens system 20 on to projection camera 13 and from the latter by transmission line 21 to the control room.

In the control room the video signals from the two cameras, the live action studio camera 7 and the background or scenic projection camera 13, are composed, combined and telecast as indicated at 22, to the television receivers 23 tuned to the station, as complete live action pictures combined with background corresponding or similar to the usual stage setting, substantially as indicated at 24.

To obtain the combined results as shown, it may be necessary to shift the blocking out mask 18 both for register of the two subjects and to accommodate for distance and closeups. Accordingly, it is contemplated that the mask 18 will be shiftable by hand or otherwise, to keep the televised background in satisfactory register and properly proportioned in size to the televised live action.

To assist in these results the sighting mask 25 shown in Fig. 5 may be used, this having a transparent or open outline 26 of the masked area and which can be held in front of the monitor 11 showing the televised live action, to see just where the blanking out mask 18 should be for proper coordination of the two pictures.

Actually the two masks, that is, the sighting mask 25 and the blanking out mask 18 may be mechanically, electrically or otherwise connected, as indicated at 27, Fig. 1, so that movement of the sighting mask will effect a corresponding or properly proportioned movement of the blanking mask 18.

To enable the operator to further check and assure proper combining of the televised images, the masked background picture from 14 is shown projected through an inclined semi-reflector 28 located to transmit the reflection to a second, parallel, inclined semi-reflector 29 arranged to superpose the background image on the live action image shown by the monitor 11. This second inclined reflector, being of the half silvered or semi-transparent type, permits an observer in front of this second reflector to see the two images combined on the monitor and to then operate the sighting mask to keep the two images in alignment and in proper, proportionately sized relation.

In addition to its purpose as a background or scenic camera, the second camera 13 may be utilized for projecting other matter such as information on cards, slides and the like.

In Fig. 1 a slide, card or like projector is shown at 30, arranged to project desired subject matter onto an inclined semi-reflector 31 in front of the projection camera 13.

At the time this projector is in use the background projector will not be in use, and accordingly a shutter 32 may be shifted into cut-off position between the two inclined semi-reflectors 28 and 31.

Other projectors may be used with the system, such as the one indicated at 33, above or to one side of the optical system 20 for the background projector and arranged to project desired subject matter such as a clock, titles or advertising, through the semi-reflectors 28, 31, into the projection camera 13.

The invention, it will be seen, makes it possible to produce video pictures with the simplest to the most involved forms of settings without the expense of providing and handling special stage sets. All that is required in each case is a satisfactory picture of the desired setting, which possibly may be made up in the studio, and means for illuminating and projecting that part of the picture which is to show as the background or setting, into the projection camera for combining with the action picture. The picture of the setting may be on a card or transparency. If on a slide or transparency the light may be projected directly through the same, and if opaque, projection may be effected with reflectors.

The masks for blocking out the area for the live action picture may be readily made up in the studio by simply cutting out suitable masking material to the shape of the area to be covered and mounting it on glass in the position it is to cover. The sighting mask 25 is easily made by simply tracing an outline on glass of the area to be covered, possibly with some kind of a center mark for enabling it to be quickly centered over the live action scene appearing on the monitor 11.

These two masks, the blanking mask 18 and the sighting mask 25, may be placed in holders mounted for universal movement and connected so that movement of the sighting mask will effect corresponding or proportional movements of the blanking mask, enabling an operator observing the monitor to keep the background scene at all times in proper register and focal relation with the live action scene.

The blanking or obscuring mask may be cut or arranged to effect sharp distinction between action and background or to shade or merge one more or less gradually into the other, and various fading in and out effects may be obtained for focusing adjustments.

The blanking out mask 18 may be used either in front of or behind the transparency or background scene 14.

All kinds of scenic effects such as rain, snow, lightning and the like, are readily attainable by the use of appropriate scenic cards, slides or transparencies, and any scene can be quickly and immediately changed by simply substituting one card or the like for another.

By providing a mask with a hole in it, that is with a small transparent portion, and shifting it around, spotlight, searchlight and other such effects are readily created.

The combined images from the live scene and the background scene which are electronically mixed in the control room, may be transmitted over the air or sent out by cable or otherwise, or may be photographed on film for later showing.

The picture element 14, as well as the light source and lens system, may be movable for enlarging or reducing the image. The live action and accompanying background may be shown with equal or unequal brilliance, according to requirements, since there is no conflict or overlapping of the images produced.

What is claimed is:

1. Apparatus for producing composite television pictures and comprising a studio camera for televising live action, a projection camera for televising scenic effects to go with the live action, means for illuminating and projecting only that portion of the picture of a scene which will go with the live action without obscuring the same, into said projection camera and means for effecting registration and combination of the action televised by the studio camera and that portion of the scenic subject matter televised by the projection camera, including a mask for the pictured subject matter corresponding generally to the included area televised by the studio camera, a monitor for the studio camera and means for projecting the scenic subject televised by the projection camera on to said monitor, and a mask having an outline of the included live action area for sighting the televised scenic subject matter over the live action monitor.

2. Apparatus for producing composite television pictures and comprising a studio camera for televising live action, a projection camera for televising scenic effects to go with the live action, means for illuminating and projecting only that portion of the picture of a scene which will go with the live action without obscuring the same, into said projection camera and means for effecting registration and combination of the action televised by the studio camera and that portion of the scenic subject matter televised by the projection camera, including a mask for the pictured subject matter corresponding generally to the included area televised by the studio camera, a monitor for the studio camera and means for projecting the scenic subject televised by the projection camera on to said monitor, a mask having an outline of the included live action area for sighting the televised scenic subject matter over the live action monitor and connections from said sighting mask to said first mentioned mask for effecting corresponding adjustments of the masks.

3. Apparatus for producing composite television pictures and comprising a studio camera for televising live action, a projection camera for televising scenic effects to go with the live action, means for illuminating and projecting only that portion of the picture of a scene which will go with the live action without obscuring the same, into said projection camera and means for effecting registration and combination of the action televised by the studio camera and that portion of the scenic subject matter televised by the projection camera, including a monitor for the studio camera and partial reflectors for optically transmitting the televised scenic subject matter to said monitor and through which said televised scenic subject matter may be observed combined with the televised live action.

References Cited in the file of this patent

UNITED STATES PATENTS

| 1,690,039 | Schufftan | Oct. 30, 1928 |
| 2,061,378 | Henze | Nov. 17, 1936 |
| 2,164,297 | Bedford | June 27, 1939 |
| 2,193,869 | Goldsmith | Mar. 19, 1940 |
| 2,506,127 | Allen | May 2, 1950 |
| 2,611,819 | Serrell | Sept. 23, 1952 |
| 2,613,263 | Hilburn | Oct. 7, 1952 |

FOREIGN PATENTS

| 438,533 | Great Britain | Nov. 19, 1939 |